United States Patent

[11] 3,595,076

| [72] | Inventor | Leonard J. Eyges |
| | | 21 North Road, Bedford, Mass. |
| [21] | Appl. No. | 823,588 |
| [22] | Filed | May 12, 1969 |
| [45] | Patented | July 27, 1971 |

[54] DEVICE FOR MEASURING VELOCITY
7 Claims, 7 Drawing Figs.

[52] U.S. Cl. ................................................. 73/194 EM
[51] Int. Cl. ................................................. G01p 5/08
[50] Field of Search ........................................... 73/194, 189, 181; 324/34, 40, 41; 336/30

[56] References Cited
UNITED STATES PATENTS

| 1,925,904 | 9/1933 | Mayne | 324/34 UX |
| 2,435,043 | 1/1948 | Lehde et al. | 73/194 |
| 2,554,575 | 5/1951 | Kurtz et al. | 324/41 X |
| 2,608,860 | 9/1952 | Ramey et al. | 73/194 |
| 3,249,869 | 5/1966 | Meyer et al. | 324/34 X |
| 3,292,079 | 12/1966 | Schindler | 73/194 UX |
| 3,395,341 | 7/1968 | Malaquin | 324/41 X |

FOREIGN PATENTS

| 1,157,500 | 12/1957 | France | 73/194 |

*Primary Examiner*—Charles A. Ruehl
*Attorneys*—Sewall P. Bronstein and Donald Brown

ABSTRACT: A device for measuring the relative speed of an object which is moving with respect to a conducting fluid or vice versa and which includes means for establishing a primary magnetic field through the fluid and means for detecting and measuring the secondary magnetic field induced by said primary field in a manner such that the primary field does not substantially disturb the measurement of the secondary field.

PATENTED JUL 27 1971 3,595,076
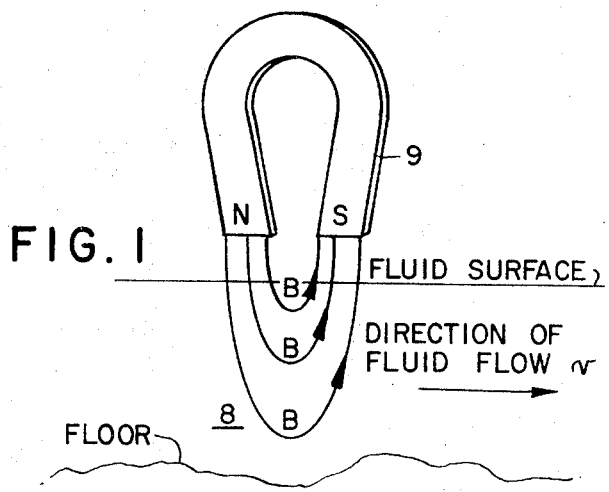
FIG.1
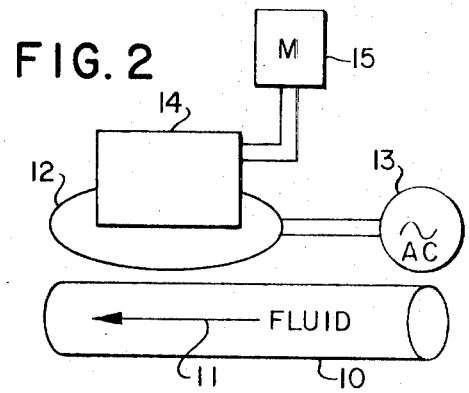
FIG.2
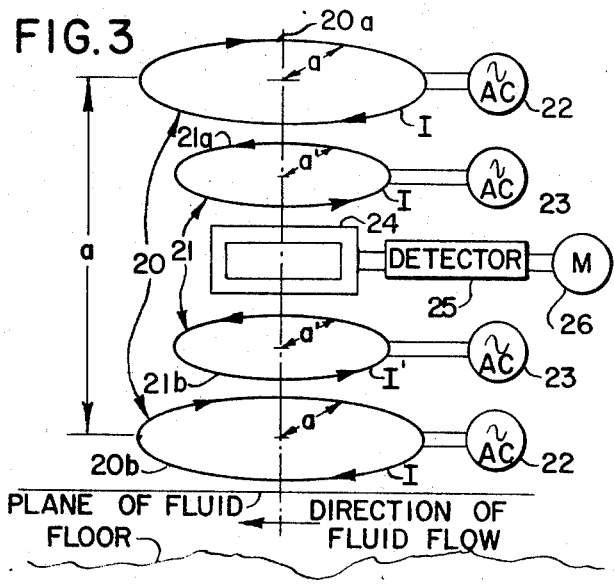
FIG.3
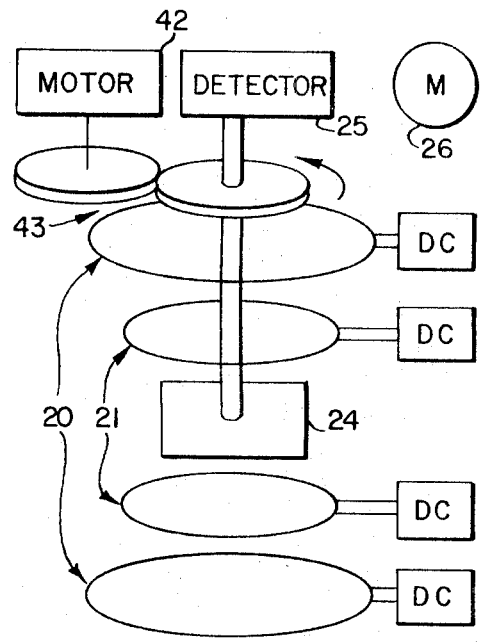
FIG.7
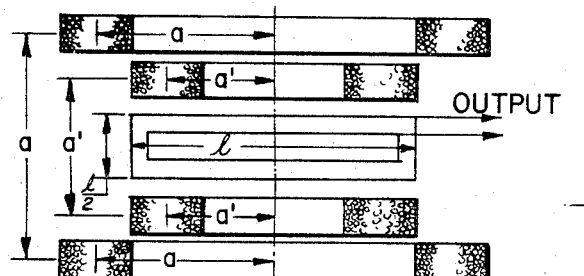
FIG.4
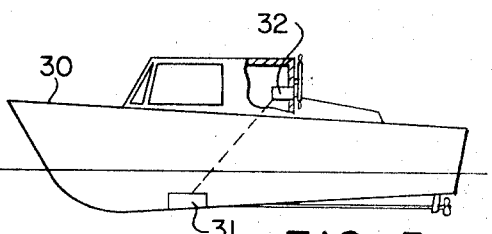
FIG.5
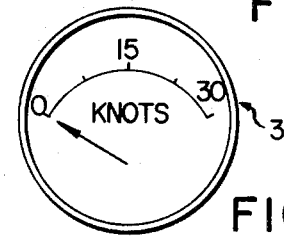
FIG.6
INVENTOR
LEONARD J. EYGES
BY
ATTORNEYS

DEVICE FOR MEASURING VELOCITY

BACKGROUND OF THE INVENTION

This invention is directed to measuring the flow speed of velocity of a conducting fluid such as sea water relative to an object or the velocity of a moving object relative to a fluid (still or moving). The device of this invention is useful as a boat speedometer or in a system for determining the velocity of conducting fluids (i.e. liquid metal such as mercury) passing through pipes, tubes or the like.

The basis of this invention relies on the principle that a secondary or induced magnetic field $B_v$ may be generated by a primary magnetic field B passing through a conducting fluid and which when detected provides a measure of the relative velocity of the fluid with respect to another object. The prior art as exemplified in U.S. Pat. Nos. 2,435,043; 2,608,860 and 3,191,436 disclose systems for detecting the induced magnetic field $B_v$ as a measure of velocity. In each of these patents, there is provided schemes which attempts to detect $B_v$ (which is typically of the order of $10^{18}$ of the primary field B for sea water) in the presence of the primary field B. Each of the patents involves some form of balancing out of the primary currents so that they produce a small amount of disturbance and therefore do not substantially interfere with the detection of the much smaller current induced by the field $B_v$. Although each of the above mentioned patents do disclose means for measuring $B_v$, none of them provides as does this invention, a new and improved technique for measuring the induced field $B_v$ in the presence of B, without requiring means for balancing out the primary currents.

Accordingly, the principle object of this invention is to provide a new and improved device for measuring the relative speed or velocity of an object which is moving with respect to conducting fluid or vice versa.

Another object of this invention is to provide a new and improved device for determining the speed of a water craft relative to the water in which it is moving.

It is a further object of the invention to provide a new and improved method for determining the relative velocity of an object with respect to a conducting fluid.

Still another object is to provide a new and improved device capable of functioning as a boat or a ship speedometer.

Other objects and advantages of this invention will become apparent from the detailed description and claims, taken in conjunction with the accompanying drawing made a part hereof.

DESCRIPTION OF THE DRAWINGS

FIG. 1 is a schematic diagram illustrating some of the principles of this invention;

FIG. 2 is a diagram illustrating the use of an embodiment of this invention to determine the velocity of a conducting fluid passing through a plastic or nonconducting material pipe;

FIG. 3 is a schematic diagram illustrating the preferred embodiment according to this invention;

FIG. 4 is a vertical section of the device of FIG. 2;

FIG. 5 is a diagram illustrating the use of an embodiment of this invention as a boat speedometer;

FIG. 6 shows the face of a meter of the boat speedometer calibrated in knots; and FIG. 7 shows an alternate embodiment of the invention.

DESCRIPTION OF THE INVENTION

For a better understanding of the principles involved in this invention reference should now be had to FIG. 1 which shows in a schematic form a conducting fluid 8 (of a conductivity $\alpha$) which is moving at a velocity v with respect to a schematized magnet 9 placed out of but along side the fluid 8 and which produces a primary magnetic field B as shown.

With this configuration then, the moving ions (or electrons) of the fluid will experience a Lorentz force $E_v \approx v \times B$ which then gives rise to a current J (proportional to $E_v \times \alpha$), and which then produces a secondary or induced magnetic field $B_v$.

By measuring $B_v$ in the reference frame of the magnet in terms of the current it induces in a pickup coil, one has a measure of the velocity v. $B_v$ is measured using a secondary coil which is positioned to intercept the induced field and wherein a detector and/or meter is provided for measuring the current induced in the secondary field. Devices for intercepting the induced field and measuring the current are disclosed in the aforementioned patents. With the devices of the prior art, the major difficulty in obtaining a useful measurement of $B_v$ is that field $B_v$ may be very small (as low as $10^{18}$ smaller than B) and that it must be measured in the presence of the large primary field B. One scheme for overcoming this difficulty is represented in FIG. 2, wherein the pickup coil for measuring the induced field is precisely geometrically positioned (i.e. plane contains axis of generating coil) with respect to the coil generating the primary field B. In FIG. 2 there is shown a tube 10 (round or rectangular) for example of a nonconducting material such as plastic or glass, through which an electrical conducting fluid, (e.g. salt water or mercury) is flowing as shown by the arrow 11. Positioned above the pipe 10 is a primary coil 12 (wound in the usual manner) and energized from an AC source 13. In this manner, a substantially cylindrical field B is produced. Accordingly, if a pickup loop 14 is substantially flat and its plane contains the axis of the primary coil 12 (positioned as shown) then it will not respond to the primary field B. The voltage induced in the pickup loop 14 may then be measured by a meter-detector as shown at 15. It should be understood that the pickup loop 14 may be positioned to one side of the coil 12 instead of above as shown so long as its plane contains the axis of the primary coil. It should also be understood that instead of using an AC source to energize the coil 12, a DC source may also be used and in that case means as shown schematically in FIG. 7 is provided for rotating the pickup loop 14. The reason alternating current rather than direct current is generated in the pickup look is to avoid the adverse effects produced by the earth's constant magnetic field which produces a direct current in the pickup loop. By generating an alternating current in the pickup loop, the alternating current is separated (using conventional rectifying techniques) from the direct current.

Although the device of FIG. 2 does provide adequate means for measuring the induced field $B_v$, in FIG. 3 and 4 there is shown an improved scheme which relies upon means for shaping and/or cancelling the primary field B in the area of space in which the pickup loop or coil is located. With the scheme of FIGS. 3 and 4, it is possible to produce a very large primary field in the fluid while at the same time substantially reducing or eliminating the effect of the primary field on the pickup loop.

In FIGS. 3 and 4 this is accomplished by producing two fields which are substantially uniform, equal and opposed in a region of space and which cancel each other out. To accomplish the above, FIGS. 3 and 4 show the use of two single Helmholtz coils (each coil comprises two loops). The first and the larger Helmholtz coil (the primary coil) is shown at 20 and comprises two loops 20a and 20b and the second and smaller Helmholtz coil (cancellation coil) is shown at 21 and comprises two loops 21a and 21b, Each of the loops 20a and b are driven by AC voltage sources shown at 22 and each of the loops 21a and b are driven by AC voltage sources shown at 23. At 24 there is shown the pickup loop positioned in the region of space between the Helmholtz coils where the primary field B has been substantially cancelled. There is also provided at 25, a detector such as a rectifier for generating a signal to produce an output signal on the display 26.

A description of Helmholtz coils and other schemes (by reference in the article noted below) for producing homogeneous field is disclosed in the article "Helmholtz Coils For Production of Powerful and Uniform Fields and Gradients" by S.T. Lin and A. R. Kaufmann in Reviews of Modern Physics, Volume 25, Number 1, Jan. 1953, Pages 182—190.

By way of example only and not as a limitation, a device as shown in FIGS. 3 and 4 can be constructed with 023 wire assuming the frequency of the source is 400 c.p.s. substantially as follows:

Primary Coil (20)

---

$a$ = radius of coils 20a and $b$ = 0.1 meter
$B$ = 50 gauss
$ni$ = 560 ampere turns
$\Lambda$ = 7.1 × $10^{12}$ ohms/meter
$n$ = 196 turns
$I$ = 2.86 amperes Cancellation Coil (21)

---

$a'$ = radius of coils 21a and $b$ = 0.07437
$n'$ = 144 turns

Pick Up Loop (24)

---

$l$ = 0.06 meter
$n$ = 1,000 turns

---

It should be understood that preferably the ratio of $a'/a$ should be between 0.4 and 0.85 to obtain the best results, and that the dimensions and number of turns for each of the elements may also vary, in a like manner, as long as there is provided a substantially field free area of space where the pickup loop may be positioned to operate as disclosed herein.

Referring now to FIGS. 5 and 6, there is shown a boat 30 having the speedometer device of this invention positioned as shown at 31. As long as the boat surface in the area of the hull is constructed of some nonconducting material (i.e. wood or plastic) then device 31 may be supported directly on the bottom of the boat. If the boat is of a conducting material such as metal, a cutout should be made for placement of the device 31. The bottom of the cutout may be filled in or closed off by a plastic insert. In addition, in the case of a metal hull, the device 31 may be carried in a water tight box outside and alongside the boat itself. FIG. 6 shows a display such as a meter 32 calibrated in knots for indicating the speed of the boat with respect to the water.

In FIG. 7 there is shown yet another embodiment according to this invention which shows the use of direct current to energize the Helmholtz coils 20 and 21. In this embodiment, the pick up coil 24 is rotated by a motor 42 and gear arrangement 43 and the AC output of the pickup coil is obtained by using standard coupling elements. As before the AC voltage induced in the coil 24 is electronically detected and then displayed.

This completes a description of the preferred forms of the invention. It should be understood that modification may be made in the above disclosed embodiments without departing from the spirit and scope of this invention.

What I claim is:

1. A device for measuring the relative speed of an object with respect to a conductive fluid or vice versa, said device comprising means for establishing a primary magnetic field in said fluid and in a volume of space surrounding said means out of said fluid so as to generate a secondary magnetic field inside and outside of said fluid in a manner such that it may be measured outside of said fluid, means for measuring said secondary magnetic field positioned out of said fluid, and means for establishing a shaping magnetic field only in the volume of space of said fluid to shape the primary magnetic field such that it does not substantially interfere with the detection of the secondary magnetic field.

2. A device according to claim 1 in which said means for measuring said secondary magnetic field includes means for displaying the speed of the object relative to the fluid.

3. A device according to claim 1 in which the means for shaping the primary field comprises means constructed such that the primary field is effectively cancelled out in an envelope of space in which said means for measuring the secondary field is positioned.

4. In a boat speedometer or a fluid flow speedometer having means for indicating the speed of said boat or the speed of said fluid, first means for establishing a primary magnetic field in a fluid, second means for establishing a cancellation magnetic field to cancel out a portion of said primary field in a region of space outside said fluid, and a pickup loop positioned in said region of space substantially free of said primary magnetic field for detecting the current induced in it by a secondary magnetic field induced in said fluid by said primary magnetic field, said pickup loop being coupled to said means for indicating.

5. A device for measuring the relative speed of an object with respect to a conducting fluid or vice versa, said device comprising means for establishing a primary magnetic field in a fluid so as to induce a secondary magnetic field in said fluid in a manner such that it may be measured, said means for establishing said primary magnetic field comprises a first pair of loops, means for shaping the primary magnetic field such that it does not substantially interfere with the detection of the secondary magnetic field, said means for shaping the primary magnetic field comprises a second pair of loops positioned between said first pair of loops, and means for detecting said secondary magnetic field, said means for detecting comprising a pickup coil positioned between said second pair of loops.

6. A device for measuring the relative speed of an object with respect to a conducting field or vice versa, said device comprising means for establishing a primary magnetic field in said fluid so as to induce a secondary magnetic field in said fluid so that it can be measured, means for measuring said secondary magnetic field, and means for shaping the primary magnetic field such that it does not substantially interfere with the detection of the secondary magnetic field, said means for establishing the primary magnetic field comprises a first Helmholtz coil, and said means for shaping the primary magnetic field comprises a second Helmholtz coil, both of said coils being positioned such that magnetic fields produced are opposed and substantially cancel each other in a region of space in which said means for measuring is positioned.

7. A device according to claim 6 in which said means for measuring said secondary field includes a pick up loop.